UNITED STATES PATENT OFFICE.

CHARLES S. FOWLER AND ROBERT H. FOSS, OF LAKE CITY, MINNESOTA.

FIRE AND WATER PROOF ROOF-PAINT.

SPECIFICATION forming part of Letters Patent No. 306,912, dated October 21, 1884.

Application filed August 22, 1884. (No specimens.)

*To all whom it may concern:*

Be it known that we, CHARLES S. FOWLER and ROBERT H. FOSS, both of Lake City, in the county of Wabasha and State of Minnesota, have invented a new and useful Improvement in Fire and Water Proof Roof-Paints, which improvement is fully set forth in the following specification.

The object of the present invention is to provide a fire and water proof paint compound; and it consists of the following ingredients, namely: gas-tar, rosin, salt, brimstone, Venetian red, mineral paint, and plumbago or graphite. These are compounded in the following proportions, namely: gas-tar, forty-eight gallons; rosin, six pounds; salt, fifteen pounds; brimstone, fourteen pounds; Venetian red, twelve pounds; mineral paint, fourteen pounds; plumbago or graphite, four pounds.

The proportions may be varied without essentially departing from the spirit of our invention.

In preparing the same for use we proceed as follows: The tar is first heated to a boiling-point, after which the other articles are to be thoroughly mixed together and put into the boiling tar. The whole is then well boiled for about ten minutes and the compound applied to the surface of the wood or iron while hot.

Having described our invention, what we claim is—

A fire and water proof paint compound composed of the following ingredients, viz: gas-tar, rosin, salt, brimstone, Venetian red, mineral paint, and plumbago or graphite, as and for the purposes substantially as herein set forth.

In testimony that we claim the foregoing we have hereunto set our hands, this 9th day of August, 1884, in the presence of witnesses.

CHARLES S. FOWLER.
ROBERT H. FOSS.

Witnesses:
WM. A. TEALL,
L. MULLER PETERSON.